United States Patent
Ying et al.

(10) Patent No.: US 8,611,412 B2
(45) Date of Patent: Dec. 17, 2013

(54) METHOD AND APPARATUS FOR CONSTRUCTING REFERENCE PICTURE LISTS FOR SCALABLE VIDEO

(75) Inventors: Chen Ying, Beijing (CN); Edouard Francois, Bourg des Comptes (FR); Kai Xie, Beijing (CN)

(73) Assignee: Thomson Licensing (FR)

( * ) Notice: Subject to any disclaimer, the term of this patent is extended or adjusted under 35 U.S.C. 154(b) by 1265 days.

(21) Appl. No.: 12/087,553

(22) PCT Filed: Dec. 5, 2006

(86) PCT No.: PCT/EP2006/069291
§ 371 (c)(1),
(2), (4) Date: Jul. 9, 2008

(87) PCT Pub. No.: WO2007/080033
PCT Pub. Date: Jul. 19, 2007

(65) Prior Publication Data
US 2009/0003445 A1    Jan. 1, 2009

(30) Foreign Application Priority Data

Jan. 10, 2006 (EP) .................................... 06300020

(51) Int. Cl.
*H04N 7/26* (2006.01)
*H04N 7/68* (2006.01)
*H04N 7/36* (2006.01)

(52) U.S. Cl.
USPC .................................... 375/240; 375/E7.078

(58) Field of Classification Search
USPC .............. 375/240.01–240.29, E7.078, E7.09, 375/E7.129, E7.133, E7.181, E7.199, 375/E7.262, E7.281

IPC ......................................................... H04N 7/12
See application file for complete search history.

(56) References Cited

U.S. PATENT DOCUMENTS

| 7,154,952 | B2 * | 12/2006 | Tourapis et al. | 375/240.16 |
| 7,233,621 | B2 * | 6/2007 | Jeon | 375/240.15 |
| 7,627,035 | B2 * | 12/2009 | Jeon | 375/240.15 |
| 7,940,845 | B2 * | 5/2011 | Kondo et al. | 375/240.16 |
| 8,009,739 | B2 * | 8/2011 | Holcomb et al. | 375/240.25 |

(Continued)

FOREIGN PATENT DOCUMENTS

WO    WO 03/075578    9/2003

OTHER PUBLICATIONS

G. Sullivan: "Draft Text of Recommendation H.263 Version 2 (H.263+) for Decision", Jan. 27, 1998, XP000982914.

(Continued)

*Primary Examiner* — Jay Patel
*Assistant Examiner* — Reza Aghevli
(74) *Attorney, Agent, or Firm* — Tutunjian & Bitetto, P.C.

(57) ABSTRACT

In video coding, prediction of P- and B-frames is based on reference frames, which are indicated by reference picture lists. Scalable video coding (SVC) requires this for both, base-layer and enhancement-layer. The invention describes a decoding process for reference picture list construction for spatial enhancement layer. With just one flag of syntax modification, it provides simpler and direct reference lists construction process. By using this, complicated RPLR and other syntaxes can be skipped, and the RPLR process for spatial enhancement layer can also be avoided. The process also can be used as for error concealment when the spatial enhancement layer slice is lost.

22 Claims, 1 Drawing Sheet

(56) References Cited

U.S. PATENT DOCUMENTS

| | | | |
|---|---|---|---|
| 2004/0252768 A1* | 12/2004 | Suzuki et al. | 375/240.24 |
| 2005/0195895 A1 | 9/2005 | Wu et al. | |
| 2005/0207490 A1* | 9/2005 | Wang et al. | 375/240.15 |
| 2006/0083311 A1* | 4/2006 | Winger | 375/240.16 |
| 2006/0093038 A1* | 5/2006 | Boyce | 375/240.16 |
| 2006/0198440 A1* | 9/2006 | Yin et al. | 375/240.12 |
| 2006/0233242 A1* | 10/2006 | Wang et al. | 375/240.08 |
| 2006/0239358 A1* | 10/2006 | Soh et al. | 375/240.24 |
| 2009/0207919 A1* | 8/2009 | Yin et al. | 375/240.25 |

OTHER PUBLICATIONS

Zhang Wang: "Enh. Layer intra pred using lower layer", Joint Video Team, No. JVT-Q049, Oct. 21, 2005, pp. 1-4 XP002371945.

JVT-Q202-Joint Video Team, No. JVT-Q202, Oct. 31, 2005, pp. 1-41, XP002372058.

ISO/IEC JTC1/SC29/WG11 and ITU-T SG16 Q.6: "Scalable Video Coding—Joint Draft 4", JVT-Q201 Joint Video Team (JVT), No. JVT-Q201, Oct. 31, 2005, pp. 1-137, XP002372100.

* cited by examiner

METHOD AND APPARATUS FOR CONSTRUCTING REFERENCE PICTURE LISTS FOR SCALABLE VIDEO

This application claims the benefit, under 35 U.S.C. §365 of International Application PCT/EP2006/069291, filed Dec. 5, 2006, which was published in accordance with PCT Article 21(2) on Jul. 19, 2007 in English and which claims the benefit of European patent application No. 06300020.2, filed Jan. 10, 2006.

FIELD OF THE INVENTION

This invention relates to a method and an apparatus for constructing reference picture lists for the spatial enhancement layer of scalable video.

BACKGROUND OF THE INVENTION

In video coding, pictures can be intra-coded (I-frame), predicted (P-frame) or bi-directionally predicted (B-frames). Prediction of P- and B-frames is based on previously encoded/decoded reference frames, and therefore reference picture lists are provided: P-frames have one list (list0), and B-frames have two lists (list0, list1). Since reference pictures are required for decoding other pictures, they are stored after their own decoding. SVC provides reference picture list reordering (RPLR). Spatially scalable video coding (SVC) has a base layer (BL) and one or more enhancement layers (EL). Currently, EL UPDATE has just been removed from SVC, i.e. the EL has also hierarchical B-picture structure and temporally has very close syntax as the BL[1].

Currently, JSVM[2] addresses forced RPLR commands to specify the real reference picture lists, rather than just utilize the default reference picture list construction process defined in chapter 8.2.4.2 "Initialisation process for reference picture lists" of the AVC[3] specification and 8.2.4.2 of SVC working draft (WD).

In the case that BL and spatial EL have the same frame rate, actually the same RPLR commands should be used for both layers at the encoder. However, in the case that the EL frame rate is twice the BL frame rate, the RPLR commands are different.

BRIEF SUMMARY OF THE INVENTION

In this proposal, a new decoding process for reference picture lists construction for spatial EL is introduced. With just one flag of syntax modification, it provides simpler and direct reference picture lists construction process. By using this, complicated RPLR and other syntaxes can be saved/skipped, and the RPLR process for the spatial EL can also be avoided. Moreover, this method can be used to provide the same decoded YUV sequence as JSVM, with a little improvement in coding efficiency. The process can also be used as a strong tool for error concealment when the spatial EL slice is lost.

For example, if the GOP size of the two layers is equal to 32, the BL frame rate is 15 Hz and the EL frame rate is 30 Hz (equal to the input frame rate), then BL frames with picture order count (POC) 2, 6, 10, 14, 18, 22, 26, 30 in the first GOP are in the highest temporal level and have the same frame_num, since they are coded with nal_ref_idc equal to 0 successively. However, at the EL, pictures with these POCs do not belong to the highest temporal level and the frame_num for those pictures will increase, since the nal_ref_idc for these frames are larger than 0 (they are also called B store pictures). POC numbers correspond to the display order of the pictures, ie. picture with POC=0 is displayed first, then POC=1 etc. while frame_num is a measure of the "importance" of a frame/picture in terms of serving as reference for others. In H.264, decoded reference pictures are marked as "used for short-term reference" or "used for long-term reference", and short-term decoded reference pictures are identified by the value of frame_num.

As shown in the example above, the RPLR commands for EL and BL of each frame/picture with POC 2 (2m+1) are different. During inter layer prediction, the BL reference picture lists and the EL reference picture lists—that is: ref_idx_lx of the EL frame and the ref_idx_lx of BL frame corresponding to input frames with the same POC (or same display time) if these two values are the same—need to be matched. Pictures are commonly also referred to as frames.

BRIEF DESCRIPTION OF THE DRAWINGS

Exemplary embodiments of the invention are described with reference to the accompanying drawings, which show in FIG. 1 temporal levels within BL and EL frames when GOP size is 16.

DETAILED DESCRIPTION OF THE INVENTION

The hierarchical B-picture structure described above is not mandatory, and decoders should support any GOP structure. So any form of reference picture list construction should be allowed for base layers (BL) and enhancement layers (EL). However, to take better advantage of the redundancy between corresponding pictures of two different spatial layers, the goal of the EL reference picture list construction (initialization or reference picture list reordering (RPLR)) is to make the EL reference picture list (list_0 or list_1) match the BL (or generally the lower spatial layer) list.

The following example (cf. FIG. 1) shows first conventional encoding/decoding. The base layer frame rate is 15 Hz and the enhancement layer frame rate is 30 Hz. GOP (group-of-pictures) size is equal to 16.

TABLE 1

| | BL frames Base layer | | | | | | | | |
|---|---|---|---|---|---|---|---|---|---|
| Decoding order | 0 | 1 | 2 | 3 | 4 | 5 | 6 | 7 | 8 |
| nal_ref_idc | 3 | 3 | 2 | 1 | 1 | 0 | 0 | 0 | 0 |
| frame_num | 0 | 1 | 2 | 3 | 4 | 5 | 5 | 5 | 5 |
| POC | 0 | 16 | 8 | 4 | 12 | 2 | 6 | 10 | 14 |

TABLE 2

| | EL frames Enhancement layer | | | | | | | | | | | | | | | | |
|---|---|---|---|---|---|---|---|---|---|---|---|---|---|---|---|---|---|
| Decoding order | 0 | 1 | 2 | 3 | 4 | 5 | 6 | 7 | 8 | 9 | 10 | 11 | 12 | 13 | 14 | 15 | 16 |
| nal_ref_idc | 3 | 3 | 2 | 2 | 2 | 1 | 1 | 1 | 1 | 0 | 0 | 0 | 0 | 0 | 0 | 0 | 0 |
| frame_num | 0 | 1 | 2 | 3 | 4 | 5 | 6 | 7 | 8 | 9 | 9 | 9 | 9 | 9 | 9 | 9 | 9 |
| POC | 0 | 16 | 8 | 4 | 12 | 2 | 6 | 10 | 14 | 1 | 3 | 5 | 7 | 9 | 11 | 13 | 15 |

Figure 1:
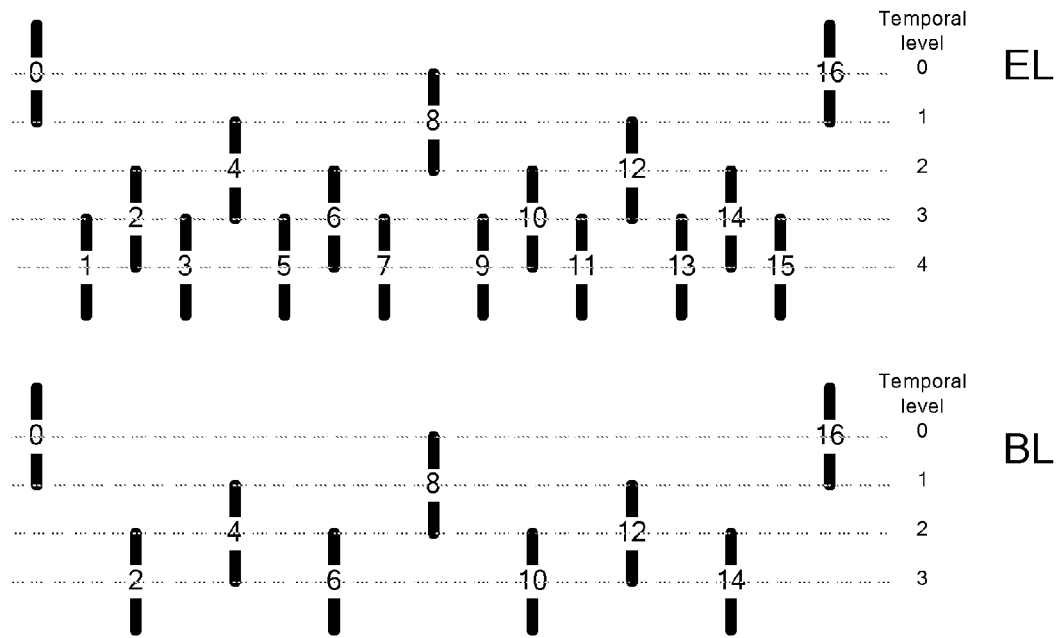

If the base layer picture with e.g. POC equal to 6 has its reference picture lists denoted by POCs, then RefPicList0 is {4,0} and RefPicList1 is {8,12,16}, see FIG. 1: frame 6 has frames 0 and 4 as possible references (ie. pictures of lower temporal level) that are previously displayed (forward prediction), and frames 8,12, and 16 as possible references that are later displayed (backward prediction). But if reference picture lists are denoted by frame_num, as listed in Tab. 1, RefPicList0 is {3,0} (eg. for POC=4: frame_num=3) and RefPicList1 is {2,4,1}. For POC=6, current frame_num is 5.

The RPLR commands for list_0 (BL) are:

| reordering_of_pic_nums_idc type | Value |
|---|---|
| 0 | 1 (5-3-1) |
| 0 | 2 (3-0-1) |
| 3 | |

Figure 2:
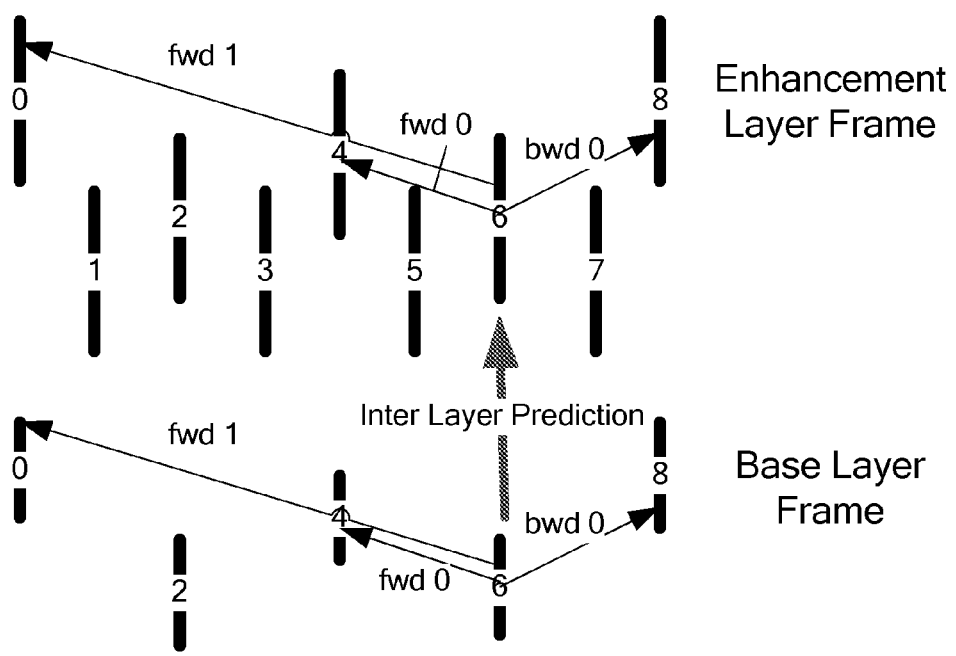
FIG. 2 inter-layer prediction of reference picture lists.

That means: for a current frame_num=5, two values are transmitted/received: reordering_of_pic_nums_idc type=0 and Value=1. From these, the decoder can deduce that the next frame_num is 3, ie. POC=4 (see Tab. 1). Similarly, a pair of reordering_of_pic_nums_idc type=0 and Value=2 with current frame_num=3 means that the next frame_num is 0. The next reordering_of_pic_nums_idc type=3 means that the loop for reordering the reference picture list is finished (cf. Tab. 7-4 in H.264). Thus, as shown in FIG. 2, the forward reference frames for frame 6 are frames 4 and 0 (in terms of their POC).

The RPLR commands for list_1 (BL) are:

| reordering_of_pic_nums_idc type | Value |
|---|---|
| 0 | 2 (5-2-1) |
| 1 | 1 (4-2-1) |
| 0 | 2 (4-1-1) |
| 3 | |

Enhancement layer picture (see Tab. 2) with POC=6 has the same lists as the BL (when denoted by POCs): RefPicList0={4,0}, RefPicList1={8,12,16}. If denoted by frame_num, RefPicList0 is {3,0} and RefPicList1 {2,4,1}. But for EL, with POC=6, the current frame_num is 6 (while it was 5 on BL). Thus, different processing is required to construct the reference frame/picture list, and all RPLR commands need to be transmitted for each frame.

The RPLR commands for list_0 (EL) are:

| reordering_of_pic_nums_idc type | Value |
|---|---|
| 0 | 2 (6-3-1) |
| 0 | 2 (3-0-1) |
| 3 | |

The RPLR commands for list_1 (EL) are:

| reordering_of_pic_nums_idc type | Value |
|---|---|
| 0 | 3 (6-2-1) |
| 1 | 1 (4-2-1) |
| 0 | 2 (4-1-1) |
| 3 | |

Thus, all these RPLR commands are complicated and the EL and BL need different RPLR commands. The solution according to the invention is to predict enhancement layer reference picture lists from the base layer reference picture lists. Thus, the reference picture lists construction is made simpler by referring to POC values instead of referring to frame_num values, and bits are saved. According to one aspect of the invention, a flag is introduced into the slice header to indicate such prediction. The flag needs only a simple reference picture list construction process for the spatial enhancement layer.

According to one aspect of the invention, a method for encoding video pictures with a first, spatially lower layer or BL, and at least one second, spatially higher layer or EL, wherein frames are predicted or bi-directionally predicted from reference frames, comprises indicating the reference frames for the second layer by referring to the reference frames for the first layer.

The method can be further specified in that an indication or flag is included in the signal, indicating that the second layer inherits the reference picture list of the first layer.

According to another aspect of the invention, a method for decoding video pictures with a first, spatially lower layer or BL and at least one second, spatially higher layer or EL, wherein frames are predicted or bi-directionally predicted from reference frames, comprises determining the reference frames for the second layer by evaluating the reference frame lists of the first layer.

The method for decoding can be further specified in that an indication is detected during decoding, wherein said determining the reference frames for the second layer is performed only upon said detection.

The methods for encoding or decoding can be further specified in that the indication refers to a slice of a picture.

The method for decoding can be further specified in that after a data loss detection a lost reference picture list of the spatially higher layer is reconstructed from a reference picture list of the spatially lower layer.

A corresponding apparatus for encoding video comprises means for performing said method for encoding.

A corresponding apparatus for decoding video comprises means for performing said method for decoding.

A corresponding video signal includes a first, spatially lower layer or BL and at least one second, spatially higher layer or EL including predicted and/or bi-directionally predicted frames and indications of respective reference frames, wherein the indication of the reference frames for the second layer pictures indicates that the reference frames for the first layer pictures are to be reused.

The video signal can be further specified in that the indication refers to a slice of a picture.

Syntax for Reference Picture Lists Construction

Based on the above rational, a solution for the spatial enhancement layer RPLR commands is provided. In one embodiment, a flag is inserted into the slice header syntax (as defined in subclause G.7.3.3 of JVT-Q201[1]), and a new processing method is introduced. It generates the sizes of the reference picture lists and then the reference picture lists based on the base layer reference picture lists, and if the flag is set to "true", the RPLR commands as specified in subclause G.8.2.4.3 "Reordering process for reference picture lists" of JVT-Q201[1] are not used. Thus, they can be skipped, so that the amount of data to be transmitted is reduced and processing at the encoder and at the decoder is simplified.

With this modification, the JSVM decoder will easily be able to construct the reference picture lists which are supposed to be provided by RPLR commands.

Although currently the JSVM decoder provides a default initialisation process for reference picture lists and this default process corresponds to the base layer reference picture lists which are generated by necessary RPLR commands, the decoding process later, as defined in G.8.2.4.2.1, will be the same as the BL. The syntax element temporal_level of the picture is equal to or less than the syntax element temporal_level of the current picture.

So, usually, to support good performance of inter layer prediction, the EL has to adjust its reference picture lists by using RPLR just based on the BL reference picture lists, although we already know the effect of the RPLR. The proposed new solution is a better way which provides the same reference picture lists, and same PSNR, but saves the bits for RPLR and processing time and effort. If each frame is coded in many slices, the advantage increases. The more slices a frame has, the more bits and processing effort are saved.

Syntax Modification

The proposed reference picture list construction method can be implemented exemplarily in JVT by a small syntax modification, as shown in Tab. 3 which shows a slice header in scalable extension.

By insertion of lines 46-48 into the table, and thus usage of a "ref_pic_list_inherit_flag", the conventional processing in the following lines 49-57 including conventional RPLR (ref_pic_list_reordering ( ) in line 57) can be skipped for many frames.

It is clear from the syntax modification that the bits for reference picture list sizes and ref_pic_list_reordering syntaxes are saved, since that part can be skipped if ref_pic_list_inherit_flag is set to "true" (see line 48 of Tab. 3).

TABLE 3

Slice header in scalable extension

| | | C | Descriptor |
|---|---|---|---|
| 1 | slice_header_in_scalable_extension( ) { | | |
| 2 |    first_mb_in_slice | 2 | ue(v) |
| 3 |    slice_type | 2 | ue(v) |
| 4 |    if( slice_type = = PR ) { | | |
| 5 |       fragmented_flag | 2 | u(1) |
| 6 |       if ( fragmented_flag = = 1 ) { | | |
| 7 |          fragment_order | 2 | ue(v) |
| 8 |          if ( fragment_order != 0 ) | | |
| 9 |             last_fragment_flag | 2 | u(1) |
| 10 |       } | | |
| 11 |       if ( fragment_order = = 0 ) { | | |
| 12 |          num_mbs_in_slice_minus1 | 2 | ue(v) |
| 13 |          luma_chroma_sep_flag | 2 | u(1) |
| 14 |       } | | |
| 15 |    } | | |
| 16 |    if ( slice_type != PR || fragment_order = = 0 ) { | | |
| 17 |       pic_parameter_set_id | 2 | ue(v) |
| 18 |       frame_num | 2 | u(v) |
| 19 |       if( !frame_mbs_only_flag ) { | | |
| 20 |          field_pic_flag | 2 | u(1) |
| 21 |          if( field_pic_flag ) | | |
| 22 |             bottom_field_flag | 2 | u(1) |
| 23 |       } | | |
| 24 |       if( nal_unit_type = = 21 ) | | |
| 25 |          idr_pic_id | 2 | ue(v) |
| 26 |       if( pic_order_cnt_type = = 0 ) { | | |
| 27 |          pic_order_cnt_lsb | 2 | u(v) |
| 28 |          if( pic_order_present_flag && !field_pic_flag ) | | |
| 29 |             delta_pic_order_cnt_bottom | 2 | se(v) |
| 30 |       } | | |
| 31 |       if( pic_order_cnt_type = = 1 && !delta pic order always zero flag ) { | | |
| 32 |          delta_pic_order_cnt[ 0 ] | 2 | se(v) |
| 33 |          if( pic_order_present_flag && !field_pic_flag ) | | |
| 34 |             delta_pic_order_cnt[ 1 ] | 2 | se(v) |
| 35 |       } | | |
| 36 |    } | | |
| 37 |    if( slice_type != PR ) { | | |
| 38 |       if( redundant_pic_cnt_present_flag ) | | |
| 39 |          redundant_pic_cnt | 2 | ue(v) |
| 40 |       if( slice_type = = EB ) | | |
| 41 |          direct_spatial_mv_pred_flag | 2 | u(1) |
| 42 |       base_id_plus1 | 2 | ue(v) |
| 43 |       If( base_id_plus1 != 0 ) { | | |

TABLE 3-continued

Slice header in scalable extension

| | | | |
|---|---|---|---|
| 44 | adaptive_prediction_flag | 2 | u(1) |
| 45 | } | | |
| 46 | if(( slice_type = = EP \|\| slice_type = = EB ) && base_id_plus1 != 0){ | | |
| 47 | ref_pic_list_inherit_flag} | 2 | u(1) |
| 48 | if(base_id_plus1 == 0\|\| !ref_pic_list_inherit_flag){ | | |
| 49 | if( slice_type = = EP \|\| slice_type = = EB ) { | | |
| 50 | num_ref_idx_active_override_flag | 2 | u(1) |
| 51 | if( num_ref_idx_active_override_flag ) { | | |
| 52 | num_ref_idx_l0_active_minus1 | 2 | ue(v) |
| 53 | if( slice_type = = EB ) | | |
| 54 | num_ref_idx_l1_active_minus1 | 2 | ue(v) |
| 55 | } | | |
| 56 | } | | |
| 57 | ref_pic_list_reordering( ) } | 2 | |
| 58 | } | | |
| 59 | If( ( weighted_pred_flag && slice_type = = EP ) \|\| | | |
| | ( weighted_bipred_idc = = 1 && slice type = = EB ) ) { | | |
| 60 | if( adaptive_prediction_flag) | | |
| 61 | base_pred_weight_table_flag | 2 | u(1) |
| 62 | if( base_pred_weight_table_flag = = 0 ) | | |
| 63 | pred_weight_table( ) | | |
| 64 | } | | |
| 65 | if( nal_ref_idc != 0 ) | | |
| 66 | dec_ref_pic_marking( ) | 2 | |
| 67 | if( entropy_coding_mode_flag && slice_type != EI ) | | |
| 68 | cabac_init_idc | 2 | ue(v) |
| 69 | } | | |
| 70 | if ( slice_type != PR \|\| fragment_order = = 0 ) { | | |
| 71 | slice_qp_delta | 2 | se(v) |
| 72 | if( deblocking_filter_control_present_flag ) { | | |
| 73 | disable_deblocking_filter_idc | 2 | ue(v) |
| 74 | if( disable_deblocking_filter_idc != 1 ) { | | |
| 75 | slice_alpha_c0_offset_div2 | 2 | se(v) |
| 76 | slice_beta_offset_div2 | 2 | se(v) |
| 77 | } | | |
| 78 | } | | |
| 79 | } | | |
| 80 | if( slice_type != PR ) | | |
| 81 | if( num_slice_groups_minus1 > 0 && | | |
| | slice_group_map_type >= 3 && slice_group_map_type <= 5) | | |
| 82 | slice_group_change_cycle | 2 | u(v) |
| 83 | if( slice_type != PR && extended_spatial_scalability > 0 ) { | | |
| 84 | if ( chroma_format_idc > 0 ) { | | |
| 85 | base_chroma_phase_x_plus1 | 2 | u(2) |
| 86 | base_chroma_phase_y_plus1 | 2 | u(2) |
| 87 | } | | |
| 88 | if( extended_spatial_scalability = = 2 ) { | | |
| 89 | scaled_base_left_offset | 2 | se(v) |
| 90 | scaled_base_top_offset | 2 | se(v) |
| 91 | scaled_base_right_offset | 2 | se(v) |
| 92 | scaled_base_bottom_offset | 2 | se(v) |
| 93 | } | | |
| 94 | } | | |
| 95 | SpatialScalabilityType = spatial_scalability_type( ) | | |
| 96 | } | | |

Semantics Modification

The ref_pic_list_inherit_flag will only be used for P- and B-slices of the EL (EP and EB slices).

ref_pic_list_inherit_flag equal to 0 specifies that the num_ref_idx_active_override_flag, num_ref_idx_l0_active_minus1, num_ref_idx_l1_active_minus1 and ref_pic_list_reordering( ) syntax will be written and their related decoding processes are in effect.

ref_pic_list_inherit_flag equal to 1 specifies that the num_ref_idx_active_override_flag, num_ref_idx_l0_active_minus1, num_ref_idx_l1_active_minus1 and ref_pic_list_reordering( ) syntax will not be written. num_ref_idx_l0_active_minus1 and num_ref_idx_l1_active_minus1 of the current slice will be the same as the values of lower spatial layer slices, and the new reference picture lists construction process will be invoked to replace the initialisation process for reference picture lists and possibly the RPLR process.

Decoding Process for the Spatial Enhancement Layer Reference Picture Lists Construction If ref_pic_list_inherit_flag is true for the enhancement layer, the new decoding process is invoked and the following process will be employed:

For the P or B slices, use the base layer reference list_0 to construct the list_0 of the current enhancement layer.

For B slices, use also the base layer reference list_1 to construct the list_1 of the current enhancement layer.

Assume we have a slice with its corresponding base layer list_X which is composed by $Lx_B = \{f_0, f_1, \ldots, f_n\}$ and we need to construct the ordered list_X of the enhancement layer $Lx_E$. Now we have the candidate enhancement layer list $L_E$ that will be used to compose the reference picture list of the current enhancement layer slice. Usually $L_E$ is composed by items in the short term list and long term list. The process for generation of $LX_E$ (which is initialized as NULL) is described as following:

```
for (i=0;i<=n;i++)
{
    Find f_Ei ∈ L_E so that f_Ei and f_i have the same POC number
    Insert f_Ei into the reference picture list Lx_E
}
```

This process is simple and direct, and is exactly what the inter layer prediction wants. This process gives the same result as the conventional forced RPLR commands at the spatial EL, but uses less data and simpler processing. This method is better than first reference picture lists initialisation plus RPLR processes.

Another example is shown in FIG. 2, where two spatial layers have different frame rates. The input GOP size is 8 and the BL has the half frame rate of the EL. Suppose we have the reference picture list_0 of the BL and want to construct the reference picture list_0 of the EL. What we really want to do is set the first reference as frame 4 (denoted by POC number) and the second reference as frame 0. RPLR commands can do this. However, just based on the POC values of the references in BL list_0, we can easily construct the EL reference list_0.

Decoding Process for the Spatial Enhancement Layer Reference Picture Lists Construction for Interlace Only Spatial Scalability The syntax introduced here can also be extended to picture adaptive frame field (PAFF) coding. Here, only the decoding process for the interlace case is shown, when both the BL and the EL are field coded. It is more complicated to generate the RPLR commands at the encoder.

Assume we have a slice with its corresponding BL list_X which is composed by an ordered field list $Lx_B = \{f_0, f_1, \ldots, f_n\}$, and we need to construct the ordered EL list_X $Lx_E$. Now we have the candidate EL list $L_E$ that will be used to compose the reference picture list of the current EL slice. Usually $L_E$ is composed by the fields that generated from the short term list and long term list. The process for generation of $Lx_E$ is described as following:

```
for (i=0;i<=n;i++)
{
    Find f_Ei ∈ L_E so that f_Ei and f_i have the same POC number
    and the same parity;
    Insert f_Ei into the reference picture list Lx_E
}
```

The items ($f_i$) in $Lx_E$, $Lx_B$ and $L_E$ are fields.

Decoding Process for Error Concealment

The proposed reference picture lists construction process can also be used to construct the reference picture lists for a lost packet of the spatial EL (error concealment).

As defined in JVT-Q046[4], a BLSkip error concealment method is introduced into JSVM and gives the best performance among the proposed methods. This method can benefit from the corresponding BL motion information if the spatial EL packet is lost. The method also works well for multiple reference cases, because the current JSVM decoder provides a default way to match the EL reference picture lists with the BL, and actually the EL does not use RPLR like the BL. During the error concealment implementation, only Key Pictures need to consider the RPLR issue to guarantee a lost Key Picture of the EL refers the previous Key picture.

[4] Chen Ying, Jill Boyce, Xie Kai "Frame Loss Error Concealment for SVC", JVT-Q046, JVT of ISO/IEC MPEG & ITU-T VCEG, Nice, October 2005

But as defined in G.8.2.4.2.1[1], the restrictions used to guarantee the above default method for non-key pictures will be removed and the initialization process will be the same as the counterpart of AVC[3].

To give correct performance for BLSkip error concealment, the later JSVM version needs to generate virtual RPLR commands for the lost packet of the spatial EL. But as discussed above, the RPLR commands of the different spatial layers can be different, and it is not straight-forward to predict the lost EL RPLR commands based on the received BL RPLR commands, because the kernel relationship between the two layer reference picture lists is based on POC numbers.

By defining the new reference picture list construction method, it is easy to guarantee that the reference picture lists constructed for the lost spatial enhancement layer packet match the corresponding base layer reference picture lists, so as to provide good performance also for BLSkip error concealment.

The invention can be used in video encoding and/or video decoding. It is most advantageous for spatially scalable video, particularly if the base layer has a different temporal resolution as the enhancement layer or layers.

The invention claimed is:

1. Method for encoding video pictures with a first, spatially lower layer and at least one second, spatially higher layer, wherein the first and second layers have different frame rates, and wherein intra-layer prediction is used for predicting pictures of the first and the second layer from one or more reference pictures of the same layer and wherein lists of reference pictures are used, comprising the steps of
    generating a list of reference pictures for a picture of the second layer based on the list of reference pictures of the corresponding picture of the first layer;
    generating an indication in the second layer indicating that and/or how the list of reference pictures for said picture of the second layer can be deduced from the list of reference pictures for the corresponding picture of the first layer; and
    associating said indication with an encoded picture of the second layer to which it refers.

2. Method according to claim 1, wherein an indication is included in the signal, indicating that the second layer inherits the reference picture list of the first layer.

3. Method for decoding video pictures with a first, spatially lower layer and at least one second, spatially higher layer, wherein the first and second layers have different frame rates, and wherein a picture of the second layer has a corresponding picture in the first layer and is predicted from one or more reference pictures of said second layer, comprising the steps of
    detecting an indication in the second layer indicating that and/or how a list of reference pictures for a picture of the second layer can be deduced from the list of reference pictures for the corresponding picture of the first layer; and
    generating or predicting the list of reference pictures for said picture of the second layer from the list of reference pictures for the corresponding picture of the first layer.

4. Method according to claim 3, wherein an indication is detected during decoding, and wherein said generating or predicting the list of reference pictures for the second layer is performed only upon said detection.

5. Method according to claim 2, wherein the indication refers to a slice of a picture.

6. Method for decoding video pictures according to claim 3, wherein after data loss detection a lost reference picture list of the spatially higher layer is reconstructed from a reference picture list of the spatially lower layer.

7. Method according to claim 1, wherein the lower spatial layer has also lower temporal resolution than the higher spatial layer.

8. Apparatus for encoding video pictures with a first, spatially lower layer and at least one second, spatially higher layer, wherein the first and second layers have different frame rates, and wherein intra-layer prediction is used for predicting pictures of the first and the second layer from one or more reference pictures of the same layer and wherein lists of reference pictures are used, comprising
- means for generating a list of reference pictures for a picture of the second layer based on the list of reference pictures of the corresponding picture of the first layer;
- means for generating an indication in the second layer indicating that and/or how the list of reference pictures for said picture of the second layer can be deduced from the list of reference pictures for the corresponding picture of the first layer; and
- means for associating said indication with an encoded picture of the second layer to which it refers.

9. Apparatus for decoding video pictures with a first, spatially lower layer and at least one second, spatially higher layer, wherein the first and second layers have different frame rates, and wherein a picture of the second layer has a corresponding picture in the first layer and is predicted from one or more reference pictures of said second layer, comprising
- means for detecting an indication in the second layer indicating that and/or how a list of reference pictures for a picture of the second layer can be deduced from the list of reference pictures for the corresponding picture of the first layer; and
- means for generating or predicting the list of reference pictures for said picture of the second layer from the list of reference pictures for the corresponding picture of the first layer.

10. Non-transitory video signal including a first, spatially lower layer and at least one second, spatially higher layer, the first and second layer having specified different frame rates, including predicted and/or bi-directionally predicted pictures and indications of respective reference pictures, wherein the indication of the reference pictures for the second layer pictures indicates that the reference pictures for the first layer pictures are to be reused.

11. Non-transitory video signal according to claim 10, wherein the indication refers to a slice of a picture.

12. Non-transitory video signal according to claim 10, wherein the lower spatial layer has also lower temporal resolution than the higher spatial layer.

13. Method according to claim 1, wherein the indication is a flag.

14. Method according to claim 3, wherein the indication is a flag.

15. Apparatus according to claim 8, wherein the indication is a flag.

16. Apparatus according to claim 9, wherein the indication is a flag.

17. Non-transitory video signal according to claim 10, wherein the indication is a flag.

18. Method according to claim 1, wherein the list of reference pictures for a picture of the second layer comprises reference pictures of only the second layer.

19. Method according to claim 3, wherein the list of reference pictures for a picture of the second layer comprises reference pictures of only the second layer.

20. Apparatus according to claim 8, wherein the list of reference pictures for a picture of the second layer comprises reference pictures of only the second layer.

21. Apparatus according to claim 9, wherein the list of reference pictures for a picture of the second layer comprises reference pictures of only the second layer.

22. Non-transitory video signal according to claim 10, wherein the list of reference pictures for a picture of the second layer comprises reference pictures of only the second layer.

* * * * *